(12) United States Patent
St. Hilaire et al.

(10) Patent No.: US 6,904,201 B1
(45) Date of Patent: Jun. 7, 2005

(54) PHASE-CONTROLLED FIBER BRAGG GRATINGS AND MANUFACTURING METHODS

(75) Inventors: Pierre St. Hilaire, Belmont, CA (US); Anders Grunnet-Jepsen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 10/142,329

(22) Filed: May 9, 2002

Related U.S. Application Data
(60) Provisional application No. 60/289,930, filed on May 9, 2001.

(51) Int. Cl.[7] ................................................. G02B 6/34
(52) U.S. Cl. ............................ 385/37; 385/16; 385/12; 385/14; 385/122; 430/1; 430/2; 430/321; 359/34; 359/35; 359/570
(58) Field of Search ........................... 385/16, 37, 12, 385/14, 123, 122, 124, 240, 170, 10, 40, 35, 130; 430/321, 1, 2; 356/346, 401; 359/34, 35, 570, 3, 4; 250/492.1

(56) References Cited

U.S. PATENT DOCUMENTS

| | | | | |
|---|---|---|---|---|
| 4,560,249 A | * | 12/1985 | Nishiwaki et al. ............. | 359/3 |
| 4,673,241 A | * | 6/1987 | Nishiwaki et al. ............. | 359/4 |
| 4,989,936 A | * | 2/1991 | Coyle et al. ................... | 385/28 |
| 5,042,897 A | * | 8/1991 | Meltz et al. .................... | 385/37 |
| 5,066,133 A | * | 11/1991 | Brienza ....................... | 359/570 |
| 5,225,039 A | * | 7/1993 | Ohguri ......................... | 216/24 |
| 5,309,260 A | * | 5/1994 | Mizrahi et al. ................ | 359/3 |
| 5,388,173 A | * | 2/1995 | Glenn .......................... | 385/37 |
| 5,481,362 A | * | 1/1996 | Van Den Brink et al. .. | 356/401 |
| 5,526,338 A | * | 6/1996 | Hasman et al. ............... | 369/94 |
| 5,552,882 A | * | 9/1996 | Lyons et al. ................. | 356/73.1 |
| 5,633,966 A | * | 5/1997 | Nakaishi ...................... | 385/37 |
| 5,668,901 A | * | 9/1997 | Keck et al. ................... | 385/37 |
| 5,917,604 A | * | 6/1999 | Dirksen et al. ............. | 356/401 |
| 6,093,927 A | * | 7/2000 | Wickham .............. | 250/227.23 |
| 6,195,483 B1 | * | 2/2001 | Moon et al. .................. | 385/37 |
| 6,210,865 B1 | * | 4/2001 | Sweatt et al. ............... | 430/311 |
| 6,249,624 B1 | * | 6/2001 | Putnam et al. ............... | 385/37 |
| 6,307,679 B1 | * | 10/2001 | Kashyap ..................... | 359/569 |
| 6,310,996 B1 | * | 10/2001 | Byron ......................... | 385/37 |
| 6,414,764 B1 | * | 7/2002 | Ouellette ..................... | 359/35 |
| 6,460,622 B1 | * | 10/2002 | Rice ........................... | 166/369 |
| 6,548,225 B1 | * | 4/2003 | Hammon et al. .......... | 430/321 |
| 6,574,395 B1 | * | 6/2003 | Mechin et al. ................ | 385/37 |
| 6,594,012 B2 | * | 7/2003 | Takeuchi et al. ............ | 356/394 |
| 2002/0141063 A1 | * | 10/2002 | Petrov et al. ............... | 359/566 |
| 2003/0081192 A1 | * | 5/2003 | Nishi .......................... | 355/69 |

FOREIGN PATENT DOCUMENTS

FR          2768819 A1 *  3/1999  ............ G02B/5/28

OTHER PUBLICATIONS

Chang et al., "Space–Invariant Achromatic Grating Interferometers: Theory", Applied Optics, vol. 14, No. 7, Jul. 1975, pp. 1592–1600.

* cited by examiner

Primary Examiner—John R. Lee
Assistant Examiner—David A. Vanore
(74) Attorney, Agent, or Firm—Trop, Pruner & Hu, P.C.

(57) ABSTRACT

A fiber Bragg grating may be written at an arbitrary wavelength without extensive recalibration or reconfiguration of the writing equipment in some embodiments. A pair of writing beams may be used to expose the fiber. The crossing angles of the writing beams may be adjusted.

30 Claims, 4 Drawing Sheets

PHASE-CONTROLLED FIBER BRAGG GRATINGS AND MANUFACTURING METHODS

CROSS-REFERENCE TO RELATED APPLICATIONS

This application is based on provisional patent application Ser. No. 60/289,930 filed May 9, 2001.

BACKGROUND

This invention relates to optical networks and, particularly, to waveguides including Bragg gratings.

An add/drop multiplexer is an important component in most optical networks. The multiplexer pulls down the desired channels from a network branch and replaces those channels with different contents. At the same time, the multiplexer lets the other channels pass through without significant insertion loss.

Generally, the add/drop multiplexer uses a fiber Bragg grating. The fiber Bragg grating drops input light at the Bragg wavelength. The characteristics of a fiber Bragg grating and, particularly, its Bragg wavelength, are fixed. In other words, a particular fiber Bragg grating is written, for example, using an ultraviolet light, to have a predetermined Bragg wavelength. As a result, a given grating may only be able to reject or drop one wavelength.

At different times, however, it may be desirable to write a grating that rejects different wavelengths. Enabling an interferometer manufacturing device to convert to writing a different Bragg wavelength may be complicated and time consuming. Substantial realignment and/or recalibration may be required in some cases.

Thus, there is a need for the ability to write a waveguide with an arbitrary Bragg wavelength.

DETAILED DESCRIPTION

Figure 1:
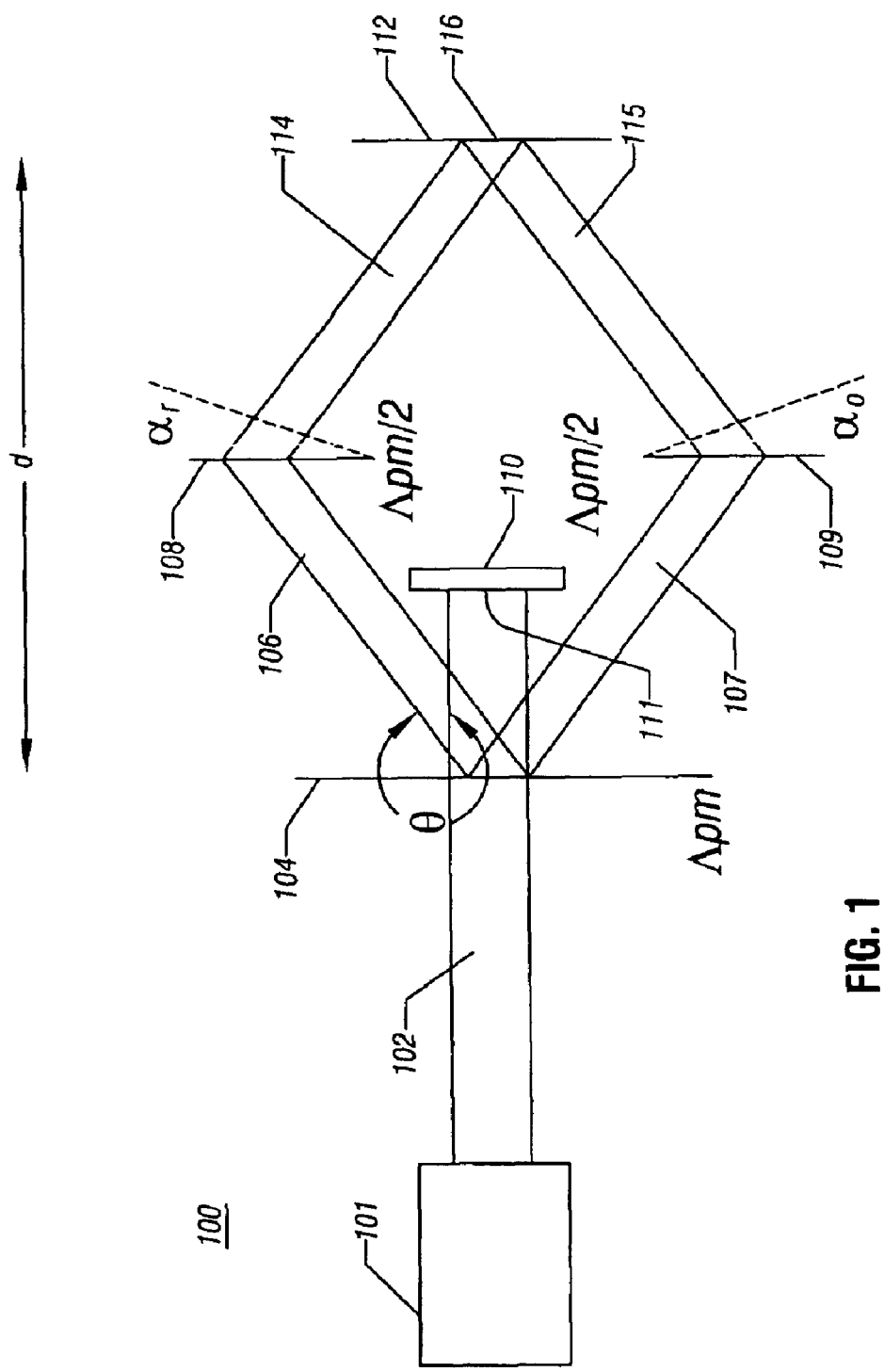
FIG. 1 is a schematic depiction of one embodiment of the present invention.

An interferometric fabrication apparatus 100, shown in FIG. 1, enables waveguide fabrication that, in some embodiments, is tolerant to substantial errors in alignment, laser beam pointing, laser wavelength, laser spectral and temporal coherence, and other potential error sources. Furthermore, the apparatus 100 permits control of grating period and grating phase in the manufacture of fiber Bragg gratings (FBGs).

The apparatus 100 includes a laser 101 (or other light source) that produces a laser beam 102 that is incident to a first diffraction grating 104 having a period $\Lambda_{pm}$. Diffraction orders 106, 107 (the +1 and −1 diffraction orders, respectively) are produced and directed to respective gratings 108, 109 that have grating periods of about $\Lambda_{pm}/2$. The gratings 108, 109 may have grating periods ranging from about 80%–120% of $\Lambda_{pm}/2$ in some embodiments. An undiffracted component 111 of the beam 102 is blocked by a baffle 110.

A diffraction order 114 (−1 order) produced by the grating 108 and a diffraction order 115 (+1 order) produced by the grating 109 are directed to a fiber 112 and produce an interference pattern 116 of period $\Lambda/2$. The period (or spatial frequency) of the interference pattern 116 at the fiber 112 can be controlled by, for example, rotating the gratings 108, 109. In a representative example, the gratings 108, 109 are rotated by substantially equal amounts but in opposite directions as indicated by angles $a_o$ and $a_r$ of FIG. 1.

The apparatus of FIG. 1 is well suited to the manufacture of FBGs, exhibiting several advantageous properties. For example, the apparatus 100 is achromatic. The first derivative of $\Lambda$ with respect to laser wavelength $\lambda$ is $d\Lambda/d\lambda=0$, i.e., the period of the interference pattern is independent of the wavelength $\lambda$. Thus, the interference pattern is relatively insensitive to changes in laser wavelength or laser spectral bandwidth. Alternatively, because $\Lambda$ is insensitive to changes in laser wavelength $\lambda$, a broadband light source or a laser having a relatively broad emission wavelength range can be used.

If $a_o=a_r=0$, then the phase of the interference pattern used to form a Bragg grating is independent of the angle of incidence of the writing beam. Because the phase of the interference pattern does not depend on the angle of incidence of the laser beam, laser pointing stability need not be precisely controlled. Accordingly, suitable light sources for the apparatus 100 include both single transverse mode and multiple transverse mode lasers, and other light sources. The angles $a_o$ and $a_r$ are adjusted to control the phase of the FBG during fabrication, but even as these angles are changed to control the FBG phase, the dependence of the phase of the interference pattern on the angle at which the laser beam is incident to the gratings 104, 108, 109 remains small because small values of $a_o$ and $a_r$ can be used for tuning the period of the interference pattern 116.

The interference pattern 116 produced by the apparatus 100 is tunable over a large range of periods or spatial frequencies by changing $a_o$ and $a_r$. Such tuning does not significantly increase interference pattern sensitivity to positioning errors or light source imperfections such as those described above. In addition, diffraction orders such as the zeroth order or higher orders can be readily blocked as needed. In order to deliver an appreciable portion of the power of the laser beam 102 to the interference pattern 116 to reduce FBG exposure times and increase manufacturing throughput, blazed gratings can be used to deliver power to a selected diffraction order or orders in some embodiments.

The apparatus 100 of FIG. 1 can be arranged in several ways for FBG fabrication. According to one embodiment, shown in FIG. 2, a fiber 152 (in which a grating is to be written) and a primary grating $G_1$ (154) are mounted on a translation stage 156 and secondary gratings $G_2$, $G_3$ (the gratings 158, 159, respectively) are fixed with respect to the translation stage 156. Beams 171, 172 produced by the gratings 158, 159, respectively, produce an interference pattern in the fiber 152. The fiber 152 is situated to be illuminated with the interference pattern such as the interference pattern 116 of FIG. 1, or other patterned illumination or radiation. The primary grating $G_1$ is additionally mounted on a high precision stage 162 so that the grating $G_1$ can be translated by a selected fraction of a period of the interference pattern with respect to the fiber 152.

A fiber Bragg grating is conveniently written in the fiber 152 section by section or by continuous scanning. For a selected section, the phase of the interference pattern is determined by translating the high precision stage 162 to within a selected fraction of a period of the pattern, and the period of the interference pattern is selected by rotation of the secondary gratings $G_2$ and $G_3$. After the phase and period of the interference pattern are determined, exposure of the fiber 152 to form a fiber Bragg grating begins by, for example, turning on the laser and/or opening a laser shutter.

The amplitude of a grating written in a particular section of fiber (e.g., the amplitude of a periodic refractive index change produced by exposure to the interference pattern) can be adjusted by either dithering $G_1$ along an axis 174 (partially washing out fringes of the interference pattern) or by lowering the exposure intensity. In additional embodiments, one or more of the gratings 154, 158, 159 are dithered along one or more axes to, for example, produce apodized FBGs. The dithering or other motion of the gratings can also be rotational. Such dithering can be uniform (the same in both directions with respect to an axis and about a central position) or asymmetric. Grating rotations can be configured to select a period of the interference pattern.

Typically, control of average refractive index in an FBG is advantageous. As a particular example, maintaining the average refractive index at or near a constant value while still allowing for variation of grating period, grating phase, and refractive index modulation permits control of FBG properties. Control of average refractive index can be accomplished by, for example, providing a constant, uniform total radiation exposure to the grating along the length of the grating. With such control, the phase, period, and amplitude of the index modulation can be selected. According to some methods, gratings can be written and erased with a series of one or more exposures (a "recording schedule") in which a phase and/or other characteristic of the interference pattern are selected for one or more of the exposures. In a representative embodiment, the phase of the interference pattern is selected for each exposure of the recording schedule. The recording schedule is generally selected based on the amplitude and phase of the refractive index modulation to be obtained in the fiber or other waveguide. For example, a sinusoidal dithering of the phase of the interference pattern provides a refractive index modulation amplitude that is proportional to a Bessel function of the dither amplitude. In other embodiments, a ratio of the intensities of the two interfering beams (i.e., the beams 171, 172) at the fiber 152 is varied while keeping the total exposure intensity substantially constant. According to additional embodiments, a low coherence writing source can be used, and the refractive index modulation amplitude can be controlled by varying a path length difference between the two beams interfering at the fiber. Such embodiments produce interference patterns having fringe visibilities that are selected based on source coherence. Low coherence sources include incoherent light sources such as arc lamps as well as lasers having limited coherence. According to additional embodiments, control of the polarization of the two interfering beams by for example half-wave plates placed in the path of the beams (i.e. beams 106 and 107, or 114 and 115) can also provide control of the fringe contrast while maintaining a constant illumination and hence average refractive index.

After exposure of a selected fiber segment is complete, the translation stage 156 is adjusted to position another fiber segment for exposure to the interference pattern, and the exposure process is repeated. This method generally uses a primary grating $G_1$ that is as long as the total length of the fiber Bragg grating to be produced. In additional embodiments, the fiber and primary and secondary gratings are stationary while the laser is moved. The laser beam can be moved by, for example, translating the laser or controlling the beam with one or more mirrors, prisms, or other reflective or refractive optical elements.

Figure 2:
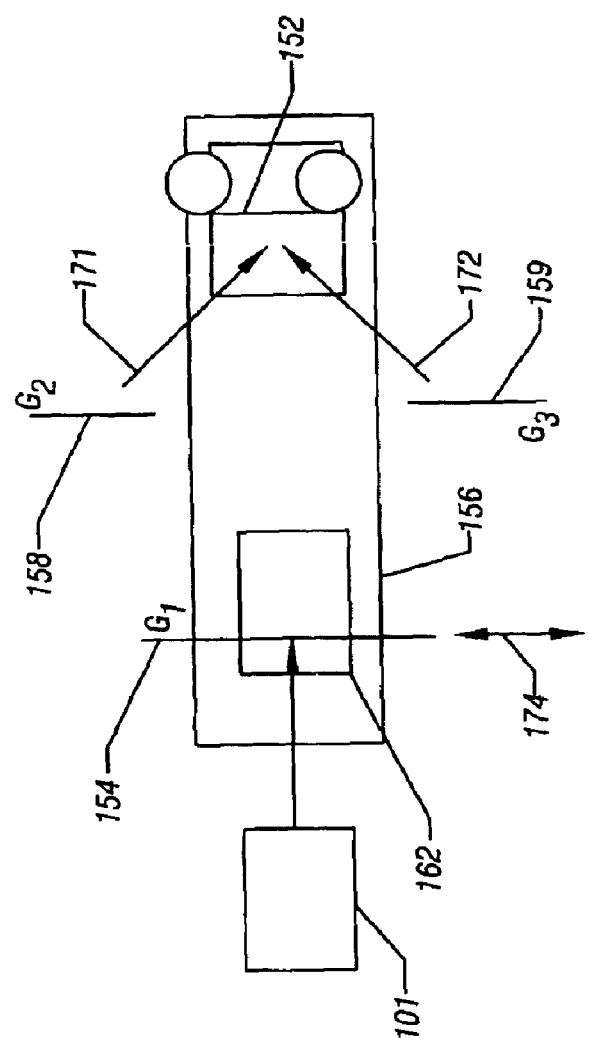
FIG. 2 is a depiction of an apparatus for implementing the embodiment shown in FIG. 1, in accordance with one embodiment of the present invention.

In other methods, diffraction orders other than the first order can be used, and reflection gratings can be used instead of the transmission gratings illustrated in FIGS. 1 and 2. In addition, secondary gratings having periods that are not equal to $\Lambda_{pm}/2$ can be used. A single grating can be used for both secondary gratings, but with limited tunability. The gratings can be amplitude gratings or phase gratings, or a combination thereof, and, as noted above, can be blazed to provide efficient transfer of power from an incident laser beam (or other optical beam) into a predetermined diffraction order. For fabrication of FBGs, radiation at wavelengths of between about 150 nm and about 450 nm is typically selected, but other wavelengths can be used depending on the photosensitivity of the fiber. In addition, exposure times for FBG fabrication can be reduced using one or more spherical or cylindrical lenses or mirrors, or other focusing elements.

Exposure methods using step-wise exposure of fibers are described above. In additional embodiments, a recording schedule can include one or more exposures of at least some portions of the fiber. For example, one section of fiber can receive multiple exposures if the writing beam has a width greater than an incremental translation distance. Another embodiment includes exposing a fiber to a writing beam having a width ω and translating the writing beam continuously across the fiber. The translation can be at a substantially constant rate, or can vary. With such a recording schedule, the total exposure can be represented as a convolution of the beam width ω with the translation profile. By recording the position of exposure of the fiber, a predetermined amount of dithering, intensity, or beam angle detuning can be applied during exposure. In this way, it is possible to programmably apply an arbitrary index modulation profile to the fiber.

Interferometric fabrication apparatus such as the apparatus 100 of FIG. 1 permits fabrication of FBGs having selectable refractive index modulations by selective application of an interference pattern to a fiber or other waveguide. Such apparatus provide interference patterns that are readily accessible so that fibers or waveguides to be exposed can be situated in the interference patterns. Other advantages of some embodiments, compared to, for example, the single phase mask contact printing method, is that the since all the beams are accessible it is possible to block spurious diffraction orders and thereby increase the effective modulation contrast at the fundamental period allowing for more efficient use of the dynamic range of the photosensitivity of the exposed waveguides. Another advantage of some embodiments of the interferometric technique is that it is possible to achieve perfect beam overlap of the interfering beams at the waveguide. This is not possible in the single phase mask approach because as the beams diffract from the phase mask the overlap of the beams decreases with increasing separation between the waveguide and the phase mask. For example, for a telecommunications fiber that has a core diameter of 9 microns and a cladding diameter of 125 microns, the smallest separation between the phase mask and waveguide is about 62.5 microns. The beam overlap becomes very important when trying to use small beam widths in order to write fine-featured index profiles into the waveguide.

Figure 3:
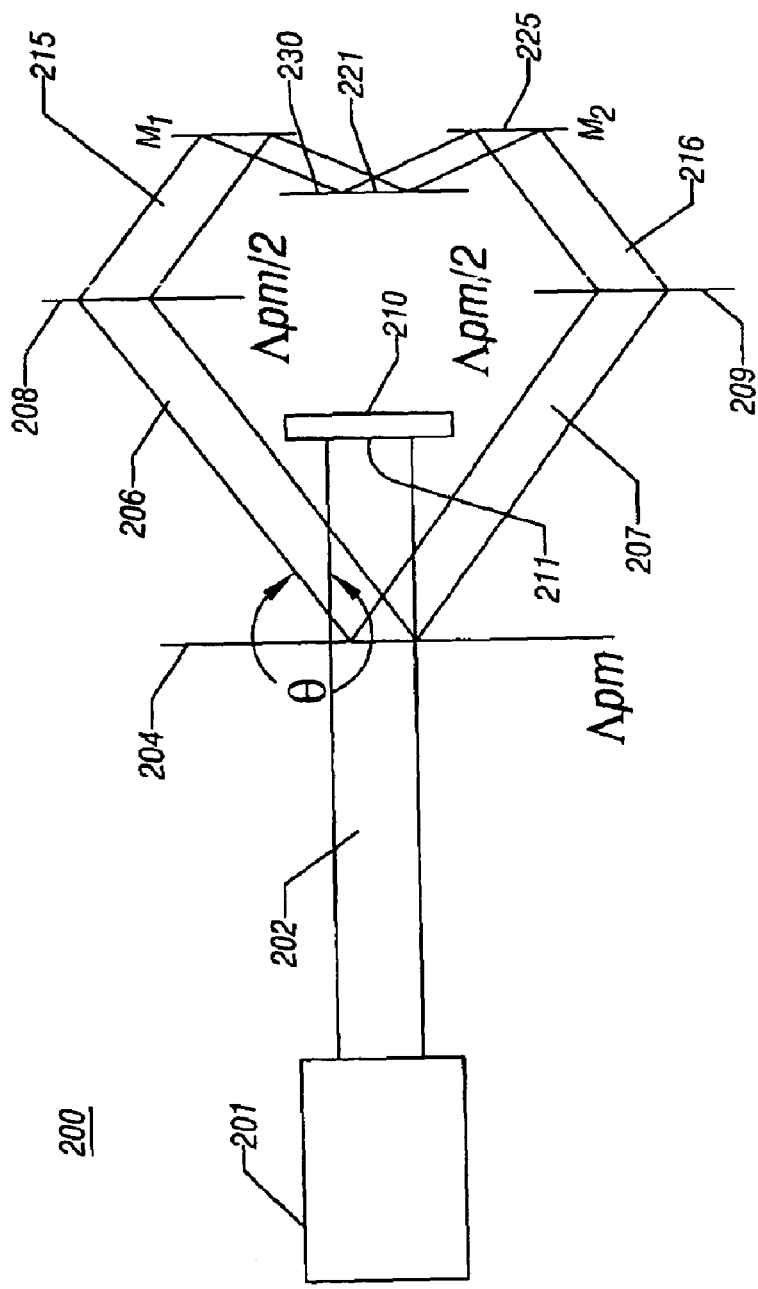
FIG. 3 is a schematic depiction of another embodiment of the present invention.

As shown in FIG. 2, a phase of an interference pattern is selectable based on rotations of the gratings 158, 159. However, rotations of the gratings 158, 159 can adversely effect the insensitivity of the interference pattern to misalignments and source imperfections. A fabrication apparatus 200 shown in FIG. 3 includes mirrors 224, 225 ($M_1$ and $M_2$, respectively) situated downstream of gratings 208, 209. The mirrors 224, 225 are configured to direct beams 215, 216 to form an interference pattern 221 at a fiber 230. By using the mirrors 224, 225 to direct the beams 215, 216, the gratings 208, 209 need not be rotated. By rotating the mirrors 224, 225 in opposite directions, the period of the refractive index modulation can be selected. By rotating the mirrors 224, 225 in the same direction, the phase of the refractive index modulation is selectable. Rotations of the mirrors 224, 225 change the position of an intersection of the beams 215, 216 but such position changes can be compensated by moving the mirrors towards or away from the fiber. Alternatively, pivot points of the mirrors $M_1$ and $M_2$ can be selected to reduce the displacement of the point of intersection.

Figure 4:
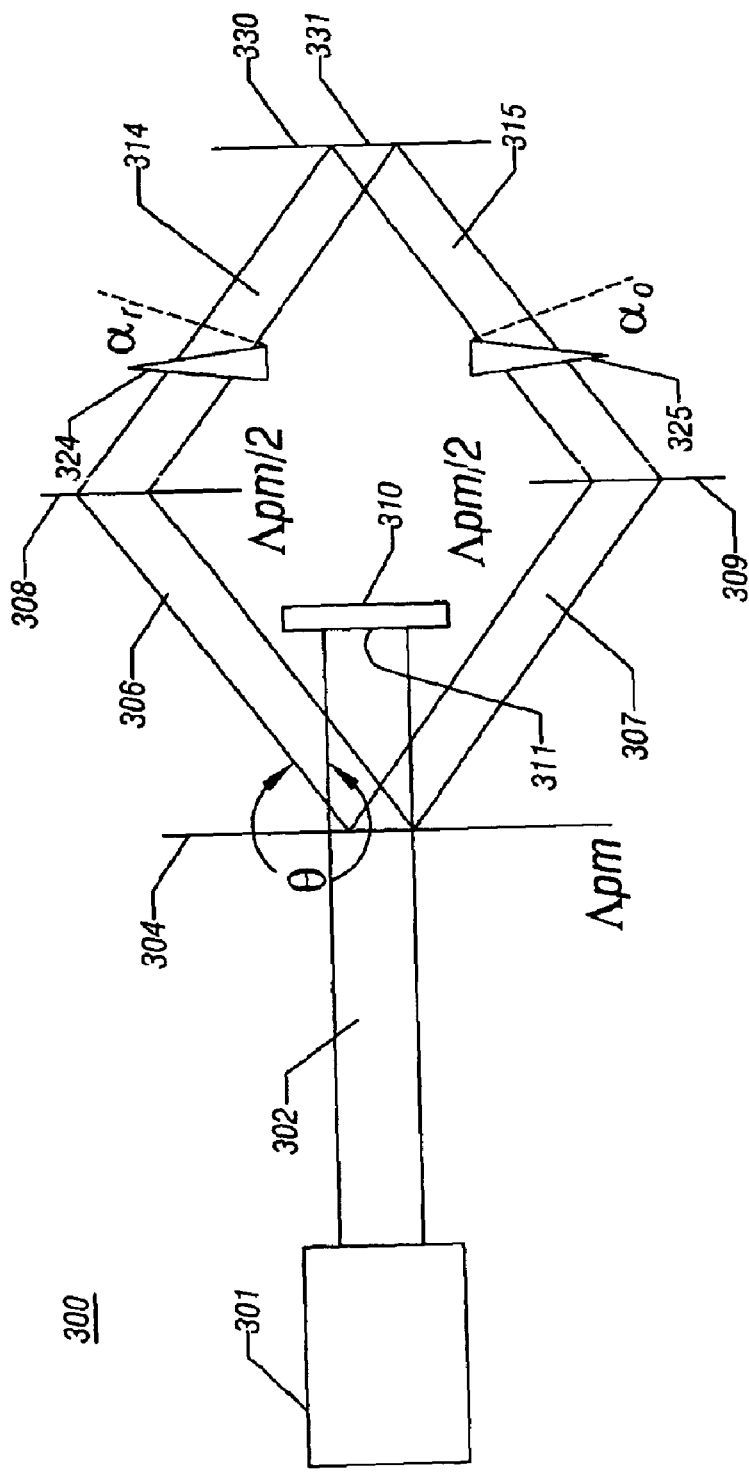
FIG. 4 is a schematic depiction of another embodiment of the present invention.

In another embodiment, an interferometric exposure apparatus 300, shown in FIG. 4, similar to that of FIGS. 1 and 2, includes prisms 324, 325 that are rotatable about angles $\alpha_r$ and $\alpha_o$ to change an angle at which beams 314, 315 intersect and thereby change the spatial frequency of an interference pattern 331 to which a fiber 330 is exposed. In some embodiments, the prisms 324, 325 are rotatable in equal amounts but in opposite directions or in the same direction.

It should be noted finally, when beam scanning is employed to write a long grating into waveguides, then the choice of the relative motions of the beams, mirrors, gratings, and waveguide needs to be carefully considered when angle tuning of the interferometer is used. For example, in FIG. 3, if mirrors M1 and M2 are kept fixed with respect to the writing beams, while gratings 204, 208 and 209 and the waveguide 221 are moved so as to effectively scan the beams across a length of waveguide, then it is important to ramp the phase difference between the beams as a function of scan length. The phase ramp depends on the angle deviation of the mirrors and should compensate for the lack of phase ramp that would ordinarily be seen if the mirrors were moved with the rest of the interferometer. The same applies to FIG. 4 for the case where the wedges are held fixed with respect to the beam during waveguide scanning.

While the present invention has been described with respect to a limited number of embodiments, those skilled in the art will appreciate numerous modifications and variations therefrom. It is intended that the appended claims &over all such modifications and variations as fall within the true spirit and scope of this present invention.

What is claimed is:

1. A method comprising:
   forming a pair of diverging grating writing beams from a light beam;
   diffracting the writing beams towards one another; and
   exposing a waveguide to said writing beams.

2. The method of claim 1 wherein forming a pair of grating writing beams includes forming a first writing beam and splitting said first writing beams into a pair of grating writing beams.

3. The method of claim 2 including using a first diffraction grating to split said first writing beam into said pair of grating writing beams.

4. The method of claim 3 including using a second pair of diffraction gratings to direct said pair of writing beams towards one another.

5. The method of claim 4 including diffracting the writing beams towards one another so that said writing beams overlap at said waveguide.

6. The method of claim 5 including controlling the polarization of said beams.

7. The method of claim 5 including ramping the phase difference between said beams as a function of beam scan length.

8. The method of claim 1 including diffracting the writing beams toward mirrors that reflect each writing beam to overlap at said waveguide.

9. The method of claim 1 including causing said writing beams to overlap at said waveguide.

10. The method of claim 9 including rotating a diffraction grating within at least one of said writing beams to change the direction of one of said beams.

11. The method of claim 10 including tuning the period of an interference pattern in said waveguide by rotating a diffraction grating in each of said writing beams.

12. The method of claim 9 including reflecting each writing beam from a mirror to expose said waveguide, and rotating said mirrors to change the period of the interference pattern produced in said waveguide.

13. The method of claim 9 including rotating a pair of prisms, one in each of said writing beams, to change the period of an interference pattern produced in said waveguide.

14. The method of claim 1 including forming a pair of grating writing beams by diffracting the light beam with a first grating, diffracting each of said pair of grating writing beams by a pair of second diffraction gratings to direct said pair of grating writing beams towards substantially the same location on a waveguide and changing the crossing angle of the writing beams.

15. An apparatus comprising:
   a first diffraction grating to split a light beam into two grating writing beams to write a grating in a waveguide; and
   a pair of second diffraction gratings in the path of each of said pair of grating writing beams to diffract each of said grating writing beams.

16. The apparatus of claim 15 including an optical wedge positioned between said waveguide and one of said second diffraction gratings.

17. The apparatus of claim 16 including a pair of optical wedges, each of said wedges positioned in the path of one of said writing beams.

18. The apparatus of claim 17 wherein each of said wedges are rotatable about an axis transverse to said writing beams.

19. The apparatus of claim 15 including a pair of mirrors to reflect said grating writing beams to overlap in said waveguide.

20. The apparatus of claim 19 wherein said mirrors are rotatable to tune the period of an interference pattern formed in said waveguide.

21. The apparatus of claim 15 wherein said second diffraction gratings are rotatable to tune the period of an interference pattern formed in said waveguide.

22. The apparatus of claim 15 including a laser to form said light beam.

23. The apparatus of claim 15 wherein said apparatus is achromatic.

24. An apparatus comprising:
   a laser to form a light beam that is diffracted to form a pair of grating writing beams;
   a device including a first diffraction grating to split the light beam into two grating writing beams to write a grating in a waveguide; and
   an element positionable in each of said writing beams to divert the writing beams to tune a period of an interference pattern formed in a waveguide.

25. The apparatus of claim 24 wherein said element includes a rotatable wedge.

26. The apparatus of claim 24 wherein said element includes a rotatable mirror.

27. The apparatus of claim 24 wherein said element includes a rotatable diffraction grating.

28. The apparatus of claim 24 wherein said device further includes a pair of second diffraction gratings, in the path of each of said pair of grating writing beams, to diffract each of said grating writing beams.

29. The apparatus of claim 24 wherein said apparatus is achromatic.

30. The apparatus of claim 24 wherein said elements are rotatable within said grating writing beams.

* * * * *